(12) United States Patent
Watanabe

(10) Patent No.: US 6,456,724 B1
(45) Date of Patent: Sep. 24, 2002

(54) ELECTRONIC WATERMARKING SYSTEM CAPABLE OF PROVIDING IMAGE DATA WITH HIGH SECRECY

(75) Inventor: Junya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/306,442

(22) Filed: May 6, 1999

(30) Foreign Application Priority Data

May 6, 1998 (JP) .............................. 10-123690

(51) Int. Cl.[7] .................................................. G06K 9/00
(52) U.S. Cl. ........................................ 382/100; 380/54
(58) Field of Search ............................ 382/100; 380/54, 380/3, 4, 23, 55, 59, 51, 48; 235/469, 454, 462.41, 494, 470, 487; 283/113, 117

(56) References Cited

U.S. PATENT DOCUMENTS 5,930,369 A * 7/1999 Cox et al. ..................... 380/54
5,949,055 A * 9/1999 Fleet et al. .................. 235/469
6,101,602 A * 8/2000 Fridrich ....................... 713/176

OTHER PUBLICATIONS

David J. Fleet and David J. Heeger "Embedding invisible information in Color Images" Oct. 1997 IEEE Proc. Int. Conf. Image Processing.*

* cited by examiner

*Primary Examiner*—Andrew W. Johns
*Assistant Examiner*—Seyed Azarian
(74) *Attorney, Agent, or Firm*—Whitham, Curtis & Christofferson, PC

(57) ABSTRACT

In an electronic watermarking device for inserting an electronic watermark into an original image, discrete cosine transformer carries out discrete cosine transform of a partial block of the original image, inserting unit inserts electronic watermarking data into an output of the discrete cosine transformer, inverse discrete cosine transformer carries out inverse discrete cosine transform of an output of the inserting unit, and coordinate converter which has coordinate conversion data carries out coordinate conversion of an output of the inverse discrete cosine transformer by the electronic watermarking data and the coordinate conversion data.

6 Claims, 4 Drawing Sheets

ELECTRONIC WATERMARKING SYSTEM CAPABLE OF PROVIDING IMAGE DATA WITH HIGH SECRECY

BACKGROUND OF THE INVENTION

This invention relates to an electronic watermarking system of a type jointly using a scramble effect, particularly to an electronic watermarking system which inserts a watermark into data and adds an scramble effect thereinto for the purpose of protecting a copyright, or the like.

Recently, an electronic watermarking system comes to be used for authenticating copyright ownership, identifying copyright infringers, or transmitting a hidden message.

As a conventional example of such an electronic watermarking system in which electronic watermarking data are embedded into a digital image, a proposal is made for a method of inserting electronic watermarking data in Nikkei Electronics, No. 660 published Apr. 22, 1996, Page 13. In the proposal, an image is converted into frequency components and the electronic watermarking data are embedded into an area having strong frequency components in an image signal after frequency conversion. The method disclosed therein is such a method for inserting ID information into digital works of which an object is a moving picture, a static picture,. a photograph, or a voice. In the method, the ID information is inserted per every buyer of the digital work so as to be used in a case that a digital work illegally copied by a person other than the buyer should be prosecuted. Further, another conventional method is also proposed, in which an improvement is made particularly for image processing systems using MPEG.

However, as will later be described more in detail, it is not enough in the conventional methods to provide digital image data with high secrecy.

SUMMARY OF THE INVENTION

It is therefore an object of the present invention to provide an electronic watermarking system which is capable of providing image data with very high secrecy.

Other objects of the present invention will become clear as the description proceeds.

According to an aspect of the present invention, there is provided an electronic watermarking device which is for use in inserting an electronic watermark into an original image consisting of a plurality of primary blocks, comprising: first discrete cosine transform means for carrying out first discrete cosine transform of at least one of the a plurality of primary blocks; inserting means for inserting electronic watermarking data into an output of the first discrete cosine transform means; inverse discrete cosine transform means for carrying out inverse discrete cosine transform of an output of the inserting means; and first coordinate converting means which have first coordinate conversion data and which carry out first coordinate conversion of an output of the inverse discrete cosine transform means by the electronic watermarking data and the coordinate conversion data.

According to another aspect or the present invention, there is provided an electronic image reproducing device which is for use in reproducing an original image from an electronic watermarked image consisting of a plurality of secondary blocks, comprising: second discrete cosine transform means for carrying out second discrete cosine transform of at least one of the a plurality of secondary blocks; extracting means for extracting electronic watermarking data from an output of the second discrete cosine transform means; extracted data containing means for containing an output of the extracting means; correspondence detecting means which compare an output of the extracted data containing means with an original electronic watermarking data to detect whether or not the output of the extracted data containing means is corresponding with the original electronic watermarking data; output image switching means which output the electronic watermarked image when the output of the extracted data containing means is detected to be not corresponding with the original electronic watermarking data by the correspondence detecting means, and first inverse coordinate converting means which have first inverse coordinate conversion data and which carry out first inverse coordinate conversion of the output of the extracted data containing means with reference to the original electronic watermarking data and the first inverse coordinate conversion data when the output of the extracted data containing means is detected to be corresponding with the original electronic watermarking data by the correspondence detecting means.

According to still another aspect of the present invention, there is provided an electronic watermarking system which is for use in inserting an electronic watermark into an original image consisting of a plurality of primary blocks, comprising: inserting means for inserting electronic watermarking data into at least one of the a plurality of primary blocks; second coordinate converting means which have second coordinate conversion data and which carry out second coordinate conversion of an output of the inserting means by the electronic watermarking data and the second coordinate conversion data; extracting means for extracting electronic watermarking data from a part of the coordinate-converted electronic watermarked image; and second inverse coordinate converting means which have second inverse coordinate conversion data and which carry out second inverse coordinate conversion of the output of the extracting means with reference to the original electronic watermarking data and the second inverse coordinate conversion data when the output of the extracting means is corresponding with the original electronic watermarking data.

The electronic watermarking data may be identical with the original electronic watermarking data, the second coordinate conversion data may be identical with the second inverse coordinate conversion data.

The second coordinate converting means may calculate a coordinate of one of the primary blocks outputted from the inserting means by the electronic watermarking data and the second coordinate conversion data, the coordinate being occupied within a region where an image having the inserted electronic watermarking data is contained.

One primary block may consist of 8×8 elements, the second coordinate conversion being carried out by converting one block coordinate into another block coordinate in a frame.

DETAILED DESCRIPTION OF THE PREFERRED EMBODIMENTS

Figure 1:
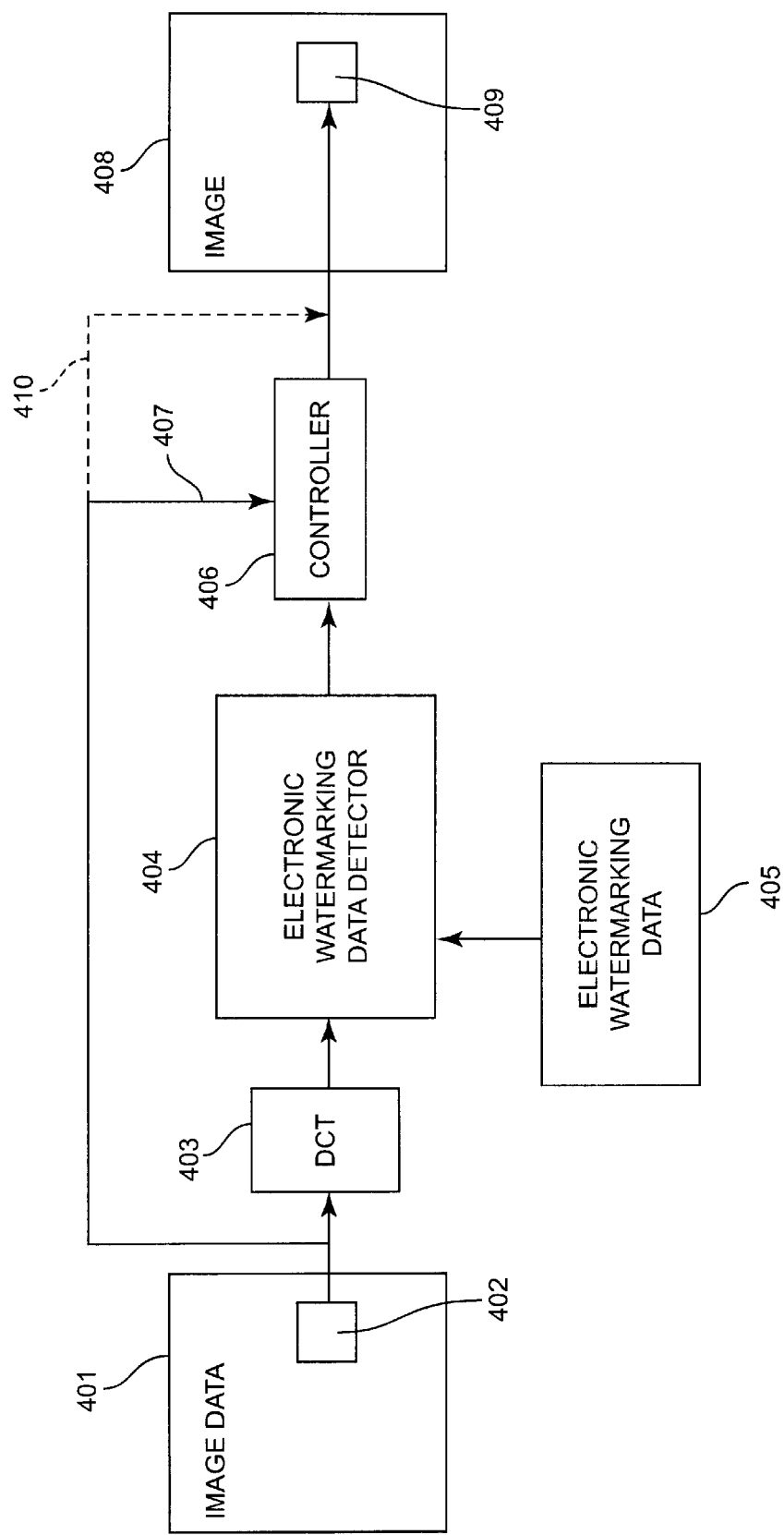
FIG. 1 is a block diagram for showing a copyright protection system in which a conventional electronic watermarking method is used.

Description is, at first, made about a conventional electronic watermarking method in order to facilitate an understanding of the present invention.

In the conventional electronic watermarking method, as mentioned in the preamble of the instant specification, the ID information is inserted per every buyer of the digital work so as to be used in a case that a digital work illegally copied by a person other than the buyer should be prosecuted. First, an original work is subjected to a frequency conversion by discrete cosine transform (DCT) or fast fourrie transform (FFT). The frequency-converted work is then subjected to inverse frequency conversion by spread spectrum using ID information of random numbers. Accordingly, a digital work having a hidden ID information is obtained. Thereafter, a difference is detected between one frequency spectrum obtained by frequency conversion for the digital work having the hidden ID information and another frequency spectrum obtained by frequency conversion for the original work. The difference is compared with an original ID information As a result, when the difference is not corresponding to the original ID information, the digital work is judged to be an illegally copied one. In this method, since the electronic watermarking data are embedded into frequency components, the electronic watermarking data are not deleted by image processing such as compression, filtering, or the like. Further, the method employs random numbers in accordance with normal distribution as the electronic watermarking data. As a result, the electronic watermarking data can be prevented from interference with each other. In addition, it becomes difficult to destroy the electronic watermarking data without giving a large influence to the whole of the image.

In this method, the electronic watermarking data are embedded into an image, as follows.

At first, an original image is converted into frequency components by the use of discrete cosine transform (DCT), or the like. Let n numbers of data $f(1), f(2), \ldots, f(n)$ each indicating high value in a frequency region be selected. Further, let n numbers of electronic watermarking data $w(1), w(2), \ldots, w(n)$ be selected from a normal distribution where average is 0, and dispersion is 1. Then, a solution in the following equation is calculated with respect to each i.

$$F(i)=f(i)+\alpha \times |f(i)| \times w(i)$$

where $\alpha$ is a scaling element.

Finally, let the f(i) be replaced with F(i) to calculate a frequency component. Accordingly, from the frequency component in which the f(i) is replaced with the F(i), an image to which the electronic watermarking data are embedded is acquired.

Next, in the method, the electronic watermarking data are detected from an image, as follows. In this detection, the original Image must be already known. In addition, also materials for the electronic watermarking data w(i) [where $i=1, 2, \ldots, n$] must be already known.

At first, an image including the electronic watermarking data is converted into frequency components by the use of DCT, or the like. In the frequency region, each value of elements corresponding to $f(1), f(2), \ldots, f(n)$, respectively in which the electronic watermarking data are embedded is defined as $F(1), F(2), \ldots, F(n)$. In view of f(i) and F(i), the electronic watermarking data W(i) is calculated to be extracted by the following equation.

$$W(i)=(F(i)-f(i))/f(i)$$

Then, statistical similarity C between w(i) and W(i) is calculated by the following equation with the use of inner product.

$$C=W \times w/(WD \times wD)$$

where $W=(W(1), W(2), \ldots, W(n))$, $w=(w(1), w(2), \ldots, w(n))$; p1 and where WD is an absolute value of vector W while wD is an absolute value of vector w.

Accordingly, when the statistical similarity C exceeds a predetermined value, the outstanding electronic watermarking data are determined to be embedded in the image.

Thus, by embedding the electronic watermarking data in the image, it is advantageous for an author owning an original image to carry out the detection processing against digital image data suspected of being an illegal copy.

However, the conventional method thus mentioned above needs an original image. As each user of an image reproducing device of each terminal does not have the original image, it is impossible for each user to carry out such a detection processing. Under the circumstances, another conventional method is proposed to improve the above-mentioned method for such a processing of a terminal user, especially for an MPEG system.

In this another conventional method, an original image is divided into a plurality of blocks each consisting of 8×8 pixels. In the another conventional method, each block is, as a unit, subjected to embedding or detecting process of electronic watermarking data.

In this method, the electronic watermarking data are embedded into an image, as follows.

At first, in a frequency region after DCT process in MPEG coding processes, let $f(1), f(2), \ldots, f(n)$ be determined, respectively, from a lower frequency one to a higher frequency one in AC components thereof. Further, let electronic watermarking data $w(1), w(2), \ldots, w(n)$ be selected from a normal distribution where average is 0, and dispersion is 1. Then, a solution in the following equation is calculated with respect to each i.

$$F(i)=f(i)+\alpha \times \text{avg}\ (f(i)) \times w(i)$$

where $\alpha$ is a scaling element and avg (f(i)) is a partially average value obtained by an average of absolute values of three points each near the f(i).

Then, let the f(i) be replaced with F(i) and thereafter the other MPEG coding processes are carried out.

Next, in the method, the electronic watermarking data are detected from an image, as follows. In this detection, the original image is not required. On the other hand, materials for the electronic watermarking data w(i) [where $i=1, 2, \ldots, n$] must be already known.

At first, in a frequency region of a block after inverse quantization in MPEG expanding Processes, let $F(1), F(2), \ldots, F(n)$ be determined, respectively, from a lower frequency one to a higher frequency one. Further, let an average value of absolute values of three points each near the F(i) be defined as a partially average value avg (F(i)). The electronic watermarking data W(i) is calculated by the following equation.

$$W(i)=F(i)/\text{avg}\ (F(i))$$

Further, WF (i), that is a total amount of W(i) over one image is calculated with respect to each i. Then, statistical similarity C between w(i) and WF(i) is calculated by the following equation with the use of inner product.

$$C=W \times w/(WFD \times wD)$$

where W=(WF(1), WF(2), . . . , WF(n)), w=(w(1), w(2), . . . , w(n));
and where WFD is an absolute value of vector WF while wD is an absolute value of vector w.

Accordingly, when the statistical similarity C exceeds a predetermined value, the outstanding electronic watermarking data are determined to be embedded in the image.

Next, referring to FIG. 1, description is made as regards a copyright protection system using the above-mentioned conventional electronic watermarking technique.

As illustrated in FIG. 1, electronic watermarking data 402 indicating prohibition of copy are previously embedded by an owner of the copyright into an image which requires prohibition of illegal use. In the detection side, image data 401 including the embedded electronic watermarking data 402 are subjected to DCT per each k×k blocks thereof by the DCT device 403. By the use of a value after the DCT, the embedded electronic watermarking data 402 are detected by an electronic watermarking data detector 404 with reference to electronic watermarking data 405. When the result of detection requires that the copy should be prohibited, the controller 406 outputs image data 408 with a copy prohibition signal 409. On the contrary, when the result of detection states that the copy should be permitted, the controller 406 outputs the Image data 401 as it stands.

However, the image data 401 are, in the color sense, such a digital image as substantially identical with an original image before the electronic watermarking data are embedded. Therefore, if a bypass transmission route 410 is unfairly formed from the image data 401 through the controller 406, as depicted by a broken line in FIG. 1, the image data 401 are outputted with no relation to the embedded electronic watermarking data. In this case, contents of the image data 401 become known.

Figure 2:
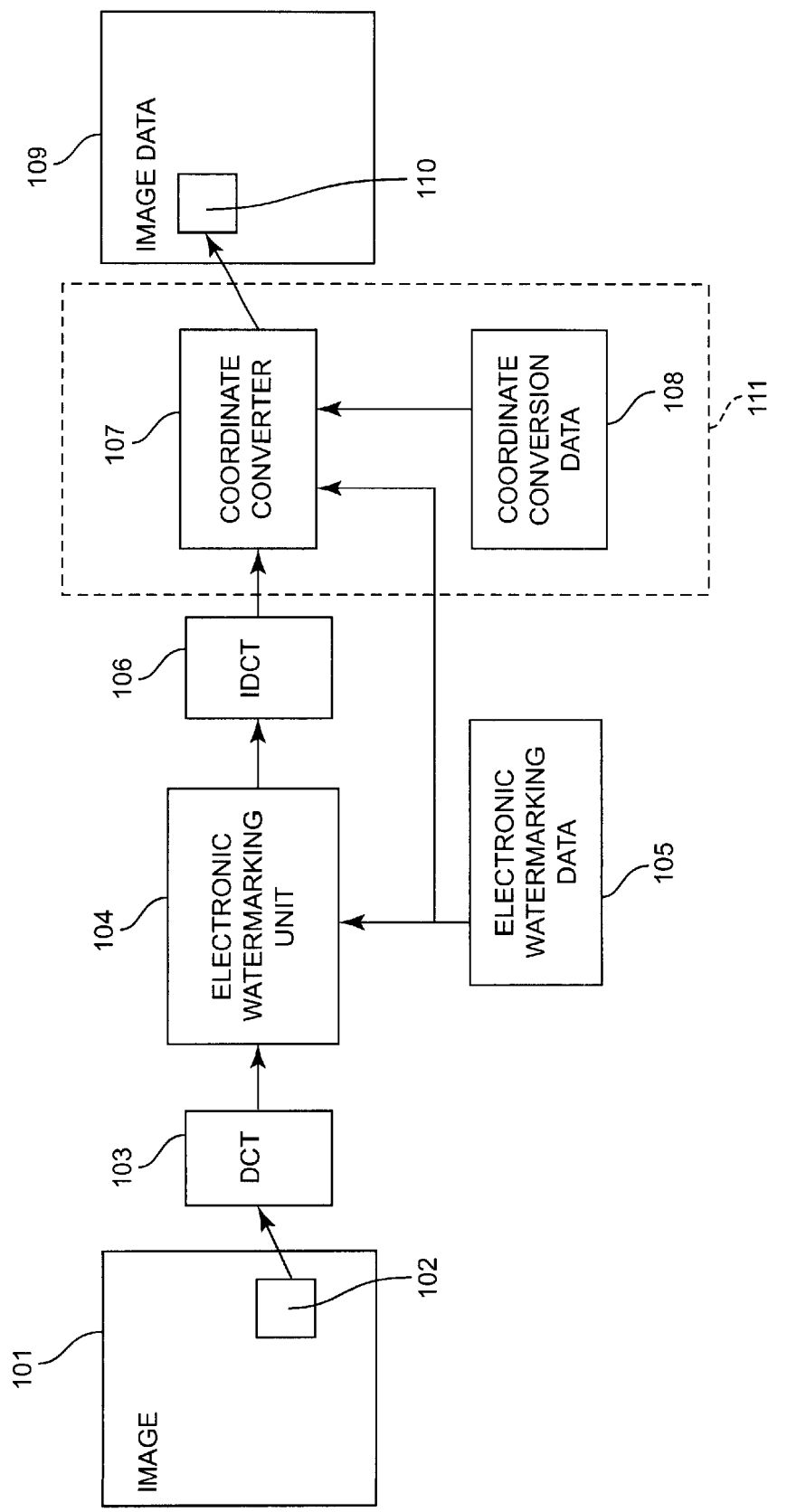
FIG. 2 is a block diagram for showing an electronic watermarking system according to a preferred embodiment of the present invention.
Figure 3:
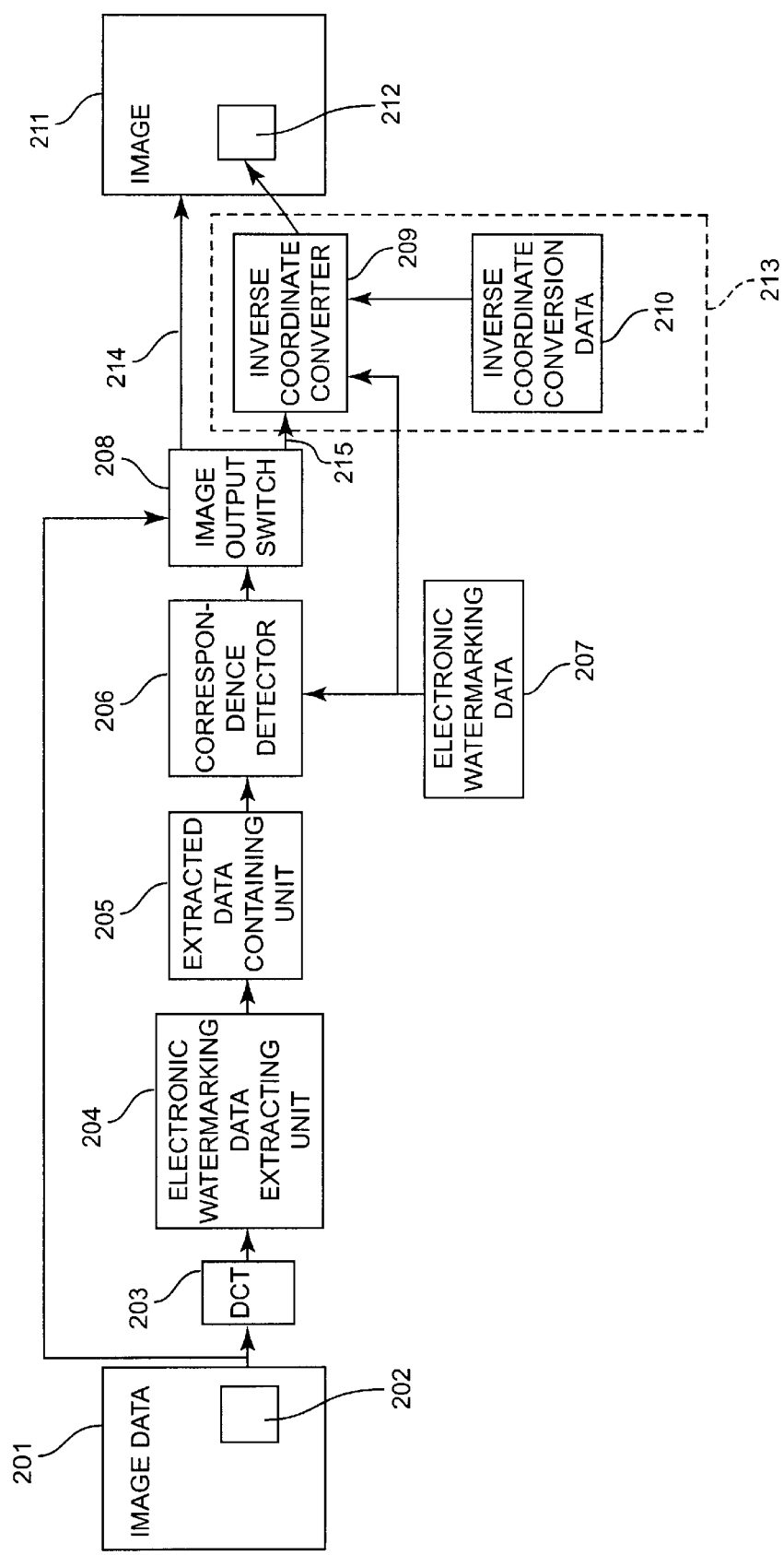
FIG. 3 is a block diagram for showing a method of reloading an image in which an electronic watermarking data are embedded by the electronic watermarking system illustrated in FIG. 2.
Figure 4:
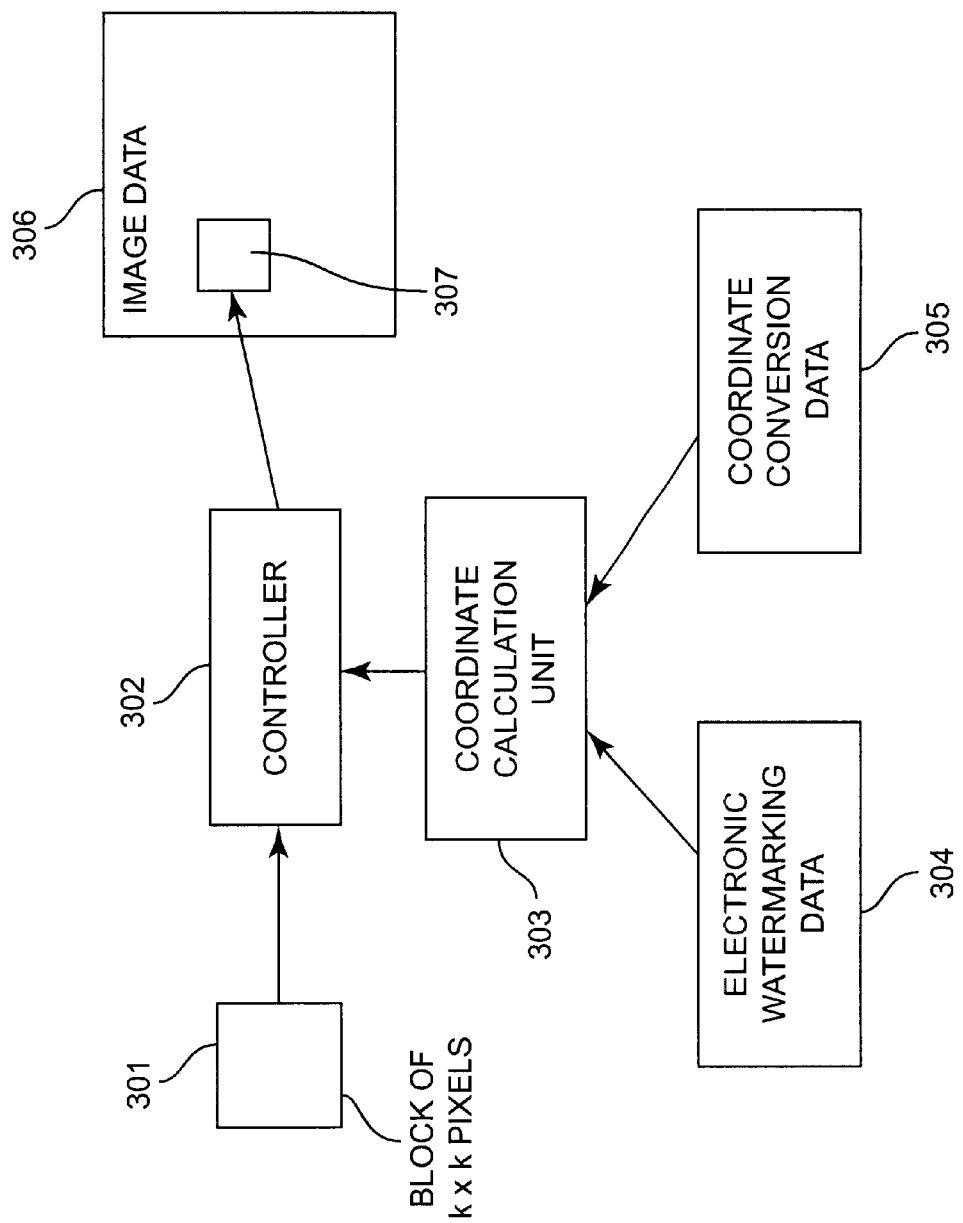
FIG. 4 is a block diagram for showing a coordinate conversion device which is used in a reloading process in the method illustrated in FIG. 3.

Now, referring to FIGS. 2 through 4, description will proceed to an electronic watermarking system according to a preferred embodiment of the present invention.

The electronic watermarking system according to the preferred embodiment comprises a first device which carries out processing for preventing an unfair use (shown in FIG. 2), and a second device for reproducing an image of which unfair use is prohibited (shown in FIG. 3).

In FIG. 2, illustrated is the first device which carries out an electronic watermarking processing and a scramble processing for a digital image to convert the digital image into such a digital image as being hardly used unfairly.

In FIG. 2, a digital image converting device comprises a DCT unit 103 which extracts a block 102 of k×k pixels to be subjected to DCT and which outputs data of the block 102 of k×k pixels after finishing the DCT, an electronic watermarking unit 104 which inserts the electronic watermarking data into the block 102 of k×k pixels by the use of electronic watermarking data 105, an IDCT unit 106 which makes the block 102 of k×k pixels having the embedded electronic watermarking data be subjected to IDCT, and a scramble device 111. The scramble device 111 includes a coordinate converter 107 which converts the coordinate of the block 102 of k×k Pixels by the use of the electronic watermarking data 105 and coordinate conversion data 108.

In FIG. 3, illustrated is a digital image reproducing device which reproduces a digital image converted by the digital image converting device illustrated in FIG. 2 as such a digital image as identical with the original image 101 in FIG. 2 in the color sense.

In FIG. 3, a digital image reproducing device comprises a DCT unit 203 which extracts a block 102 of k×k pixels from the image data 201 to be subjected to DCT and which outputs a position information of the extracted block 102 of k×k pixels and data after finishing the DCT, an extracted data containing unit 205 for containing the extracted data having the same data length as that of the electronic watermarking data, an electronic watermarking data extracting unit 204 which extracts the electronic watermarking data from frequency data of k×k pixels outputted by the DCT unit 203 and which makes the extracted electronic watermarking data be contained in the extracted data containing unit 205, a correspondence detector 206 which determine whether or not the data contained in the extracted data containing unit 205 is corresponding with the electronic watermarking data 207, an image output switch 208 which outputs the image data 201 to a reproduced image 211 or to a scramble decoder 213 in accordance with determination by the correspondence detector 206, and an inverse coordinate converter 209 which converts coordinates of every block 202 of k×k pixels in the image data 201 inputted from the image output switch 208 by the use of the electronic watermarking data 207 and inverse coordinate conversion data 210 and which outputs the the image data 201 to the reproduced image 211. The scramble decoder 213 is composed of the inverse coordinate converter 209 and the inverse coordinate conversion data 210.

In FIG. 4, illustrated is an example of the coordinate converter 107 in the scramble device 111. As illustrated in FIG. 4, the coordinate converter 107 comprises a coordinate calculation unit 303 which calculates a coordinate of a block 301 of k×k pixels outputted from the IDCT unit 106 by the use of the electronic watermarking data 304 and coordinate conversion data 305, and a controller 302 which locates the block 301 of k×k pixels into an output buffer 306 in accordance with the coordinate obtained by the coordinate calculation unit 303. In this embodiment, it is assumed that the electronic watermarking data 105 used by the electronic watermarking unit 104 have the same value as that of the electronic watermarking data 207 used by the correspondence detector 206. Further, the inverse coordinate conversion data 210 are automatically determined by the coordinate conversion data 108.

Referring to FIGS. 2 and 4, description will proceed to an operation of embedding or inserting the electronic watermarking data in the preferred embodiment of the present invention.

First, the block data 102 of k×k pixels are extracted from the original image 101 by the DCT unit 103 and then subjected to DCT. The electronic watermarking data 105 are inserted by the electronic watermarking unit 104 into frequency data of the block of k×k pixels outputted from the DCT unit 103. The data outputted from the electronic watermarking unit 104 are subjected to IDCT by the IDCT unit 106. As a result, frequency components of k×k pixels are converted into an image of k×k pixels. A new coordinate of the block of k×k pixels outputted from the IDCT unit 106 occupied in a region where an image having the inserted electronic watermarking data is contained is calculated by the coordinate converter 107 with reference to the electronic watermarking data 105 used in the electronic watermarking unit 104 and the coordinate conversion data 108. The block of k×k pixels is embedded in k×k pixels of the original image 101. Thereby, an electronic watermark is inserted into the original image 101 to obtain an image 109 including the electronic watermark.

FIG. 4 is a block diagram of the coordinate converter 107. In FIG. 4, a new coordinate of the block 301 of k×k pixels outputted from the IDCT unit 106 occupied in the output buffer is calculated by the coordinate calculation unit 303 with reference to the electronic watermarking data 304 used in the electronic watermarking unit 104 and the coordinate conversion data 305. This calculation is carried out so that the blocks each consisting of k×k pixels may have different coordinates from each other. In this coordinate calculation unit 303, an encoding operation of a scramble type is carried out. A scramble is performed in accordance with a certain rule. For example, when the coordinate conversion data is defined as A, the electronic watermarking data is defined as B, a coordinate of the block before coordinate conversion is defined as (x, y), and a coordinate of the block after coordinate conversion is defined as (X, Y) by the use of an encoding table, the following equation is available.

$$(X, Y) = f(x, y, A, B)$$

Accordingly, the new coordinate of the block of 8×8 pixels is determined by the above (X, Y).

Next, in a decoding operation, the coordinate of the block of 8×8 pixels is returned to the original coordinate thereof by a decoder under the following equation.

$$(x, y) = F(X, Y, A, B)$$

This functions as inverse coordinate conversion means.

As depicted above, the same coordinate conversion data "A" are used both in the equation of the encoder and in the equation of the decoder. Besides, it is not necessary for both the coordinate conversion data "A" to have the same values as each other, since it is enough to determine the original coordinate thereof. Thus, in this embodiment, not only a scrambled indistinguishable image but also an unscrambled distinguishable image can be detected by the same electronic watermark detector.

The block 301 of k×k pixels is located in the output buffer 306 by the controller 302 in accordance with a coordinate value outputted from the coordinate calculation unit 303. Besides, the coordinate conversion data 108 is the same element as the coordinate conversion data 305.

The above operations are carried out over the whole of a picture. The electronic watermarking data are inserted into every block of k×k pixels over the whole region of the picture. An image scrambled per each block of k×k pixels is outputted.

Referring to FIG. 3, description will proceed to an operation of reproducing the image in which the electronic watermarking data are inserted by the above-mentioned inserting operation and which is scrambled as described above.

First, the block 202 of k×k pixels is extracted from the image data 201 by the DCT unit 203 and then subjected to DCT so as to be converted into. frequency components. Components to be compared with the electronic watermarking data are extracted from frequency data outputted from the DCT unit 203 by the electronic watermarking data extracting unit 204. The extracted components are contained in the extracted data containing unit 205. It is judged by the correspondence detector 206 whether or not the extracted data contained in the extracted data containing unit 205 is corresponding with the electronic watermarking data 207. As the result of judgement by the correspondence detector 206, when the extracted data contained in the extracted data containing unit 205 is not corresponding with the electronic watermarking data 207, the image data 201 are outputted to the reproduced image 211 by the image output switch 208. Thereby, outputted are such the image data 201 that are scrambled to become a visually indistinguishable image. In this case, nothing is outputted through a route 215. On the other hand, when the extracted data contained in the extracted data containing unit 205 is corresponding with the electronic watermarking data 207, the image data 201 are outputted to the inverse coordinate converter 209 by the image output switch 208. In this case, nothing is outputted through a route 214.

With reference to the electronic watermarking data 207 and the inverse coordinate conversion data 210, coordinates are calculated by the inverse coordinate converter 209 so that the block 202 of k×k pixels may be fitted. The coordinates thus calculated are located in the reproduced image 211. These processing are repeatedly carried out on all of the blocks each consisting of k×k pixels within the image data 201.

By the above operations, in a case that the extracted data are corresponding with the electronic watermarking data, the reproduced image 211 becomes such an image as visually identical with the original image 201. On the contrary, in a case that the extracted data are not corresponding with the electronic watermarking data, the reproduced image 211 becomes such an indistinguishable image as scrambled and seems to be visually different from the original image 201.

As mentioned above, the electronic watermarking data are inserted into every block of k×k pixels. Consequently, even if a scramble operation is carried out with respect to a block of k×k pixels, as a unit, as carried out by the coordinate converter 107, it is possible to detect an electronic watermark either from. the image data 109 and the image data 211.

According to the preferred embodiment of the present invention, jointly using the scramble processing. the electronic watermarking system can prevent a user who does not have original electronic watermarking data from readily looking into image data.

Further, even if the image data were scrambled, similarly to that scrambly decoded, it is possible to detect an electronic watermark therefrom. Therefore, even after scramble decoding, it can be kept difficult that the embedded electronic watermarking data are removed.

Furthermore, the scramble processing brings different characteristics to each of the embedded electronic watermarking data, respectively from each other. It is therefore difficult to carry out scramble decoding unfairly.

Moreover, the electronic watermarking system according to the preferred embodiment of the present invention can maintain its function to prevent an unfair use, even though a bypass transmission route is formed after detecting the electronic watermarking data. Namely, in an inserting operation of the electronic watermark, electronic watermarking data are embedded, for example, by an owner of a copyright, and a digital image having the embedded electronic watermarking data is scrambled to provide such image data as completely different from original image data visually. On the other hand, in a decoding operation, the scrambled image data are descrambled to detect the electronic watermark, as decoded image data. Accordingly, as mentioned above, even after scramble decoding, it can be kept difficult that the embedded electronic watermarking data are removed. In addition, the scramble processing in the preferred embodiment of the present invention brings different characteristics to each of the embedded electronic watermarking data, respectively from each other. It is therefore difficult to carry out scramble decoding unfairly.

While the present invention has thus far been described in conjunction with only a preferred embodiment thereof, it will now be readily possible for those skilled in the art to put this invention into various other manners.

For example, in the above embodiment, description is mainly made about image data. However, the present invention is not restricted to image data but can be applied to the other digital data, such as a voice signal, text data, or the like. In a case of the voice signals, a part of the voice signal, that is too short time to hear, is subjected to DCT to be converted into frequency components. A specific frequency component is inserted, as electronic watermarking data, into the converted frequency components to obtain data. The obtained data are subjected to IDCT to be converted into original voice signal components. A short time which is too short to hear is embedded into the above-mentioned short time portion extracted from the original voice signal. The voice signal components are thereafter scrambled to be outputted as voice data similar to the original voice data. Thus, a voice signal having an electronic watermark is acquired. The voice signal having the electronic watermark can be decoded in a manner similar to that of the above-described preferred embodiment.

Further, in the above embodiment, the divided block is converted into frequency components by DCT. However, conversion into frequency components can be made by the other methods such as fast Fourier transform (FFT), orthogonal transformation, or the like. Besides, in the scramble processing, the electronic watermarking data as well as coordinate conversion data are inputted. In a reproducing process, a block of k×k pixels in which the electronic watermarking data are embedded is subjected to an inverse coordinate conversion after decoding the electronic watermarking data so as to obtain the original image. In this case, alternatively, at first, an image obtained as an output of encoder side may be subjected to inverse coordinate conversion. The inserted electronic watermarking data then may be decoded.

What is claimed is:

1. An electronic watermarking device which is for use in inserting an electronic watermark into an original image consisting of a plurality of primary blocks, comprising:

first discrete cosine transform means for carrying out first discrete cosine transform of at least one of said a plurality of primary blocks;

inserting means for inserting electronic watermarking data into an output of said first discrete cosine transform means;

inverse discrete cosine transform means for carrying out inverse discrete cosine transform of an output of said inserting means; and first coordinate converting means which have first coordinate conversion data and which carry out first coordinate conversion of an output of said inverse discrete cosine transform means by said electronic watermarking data and said coordinate conversion data.

2. An electronic image reproducing device which is for use in reproducing an original image from an electronic watermarked image consisting of a plurality of secondary blocks, comprising:

second discrete cosine transform means for carrying out second discrete cosine transform of at least one of said a plurality of secondary blocks;

extracting means for extracting electronic watermarking data from an output of said second discrete cosine transform means;

extracted data containing means for containing an output of said extracting means;

correspondence detecting means which compare an output of said extracted data containing means with an original electronic watermarking data to detect whether or not the output of said extracted data containing means is corresponding with the original electronic watermarking data;

output image switching means which output said electronic watermarked image when said output of said extracted data containing means is detected to be not corresponding with said original electronic watermarking data by said correspondence detecting means; and first inverse coordinate converting means which have first inverse coordinate conversion data and which carry out first inverse coordinate conversion of said output of said extracted data containing means with reference to said original electronic watermarking data and said first inverse coordinate conversion data when said output of said extracted data containing means is detected to be corresponding with said original electronic watermarking data by said correspondence detecting means.

3. An electronic watermarking system which is for use in inserting an electronic watermark into an original image consisting of a plurality of primary blocks, comprising:

inserting means for inserting electronic watermarking data into at least one of said a plurality of primary blocks;

second coordinate converting means which have second coordinate conversion data and which carry out second coordinate conversion of an output of said inserting means by said electronic watermarking data and said second coordinate conversion data;

extracting means for extracting electronic watermarking data from a part of the coordinate-converted electronic watermarked image; and second inverse coordinate converting means which have second inverse coordinate conversion data and which carry out second inverse coordinate conversion of said output of said extracting means with reference to said original electronic watermarking data and said second inverse coordinate conversion data when said output of said extracting means is corresponding with said original electronic watermarking data.

4. An electronic watermarking system as claimed in claim 3, wherein said electronic watermarking data is identical with said original electronic watermarking data, said second coordinate conversion data being identical with said second inverse coordinate conversion data.

5. An electronic watermarking system as claimed in claim 3, wherein said second coordinate converting means calculate a coordinate of one of said primary blocks outputted from said inserting means by said electronic watermarking data and said second coordinate conversion data, said coordinate being occupied within a region where an image having the inserted electronic watermarking data is contained.

6. An electronic watermarking system as claimed in claim 3, wherein said one primary block consists of 8×8 elements, said second coordinate conversion being carried out by converting one block coordinate into another block coordinate in a frame.

* * * * *